US005485909A

United States Patent [19]

Hay

[11] Patent Number: 5,485,909

[45] Date of Patent: Jan. 23, 1996

[54] APPARATUS WITH IMPROVED INLET AND METHOD FOR TRANSPORTING AND METERING PARTICULATE MATERIAL

[75] Inventor: Andrew G. Hay, Gardena, Calif.

[73] Assignee: Stamet, Inc., Gardena, Calif.

[21] Appl. No.: 115,173

[22] Filed: Aug. 31, 1993

[51] Int. Cl.$^6$ .......... B65G 31/04

[52] U.S. Cl. .......... 198/642

[58] Field of Search .......... 198/638, 642, 198/617; 406/99, 96, 197

[56] References Cited

U.S. PATENT DOCUMENTS

| | | | |
|---|---|---|---|
| 1,489,571 | 4/1924 | Wright . | |
| 1,668,183 | 5/1928 | Albrecht . | |
| 2,045,081 | 6/1936 | Hart | 198/128 |
| 2,081,182 | 5/1937 | Malke et al. . | |
| 2,196,390 | 4/1940 | Gates | 198/128 |
| 2,205,902 | 6/1940 | McMahan | 230/133 |
| 2,210,505 | 8/1940 | Sinden | 198/642 X |
| 2,318,881 | 5/1943 | Mundy | 198/128 |
| 2,427,659 | 9/1947 | Collyer . | |
| 2,568,536 | 9/1951 | Beech | 22/36 |
| 2,622,722 | 12/1952 | Lucas | 198/642 X |
| 2,626,571 | 1/1953 | Hoenecke | 103/135 |
| 2,637,375 | 5/1953 | Tapp et al. | 158/42.2 |
| 2,712,412 | 7/1955 | West . | |
| 2,843,047 | 7/1958 | Korber | 103/84 |
| 2,868,351 | 1/1959 | Hegmann . | |
| 3,086,696 | 4/1963 | Heine-Geldern | 230/42 |
| 3,150,815 | 9/1964 | Laing | 230/42 |
| 3,592,394 | 7/1971 | Sinden . | |
| 3,643,516 | 2/1972 | Jacobson . | |
| 3,765,216 | 10/1973 | Green | 72/262 |
| 3,889,588 | 6/1975 | Wollersheim | 100/177 |
| 4,023,784 | 5/1977 | Wallace . | |
| 4,032,254 | 6/1977 | Bentz et al. | 415/54 |
| 4,043,445 | 8/1977 | Wirth et al. | 198/611 |
| 4,076,460 | 2/1978 | Roof . | |
| 4,177,005 | 12/1979 | Bozung et al. | 415/128 |
| 4,193,737 | 3/1980 | Lemmon | 406/99 |
| 4,274,527 | 6/1981 | Baker | 193/2 B X |
| 4,335,994 | 6/1982 | Gurth | 406/99 |
| 4,409,746 | 10/1983 | Beck | 406/96 |
| 4,516,674 | 5/1985 | Firth . | |
| 4,597,491 | 7/1986 | Conklin . | |
| 4,616,961 | 10/1986 | Burrough et al. | 406/99 |
| 4,678,076 | 7/1987 | Nenakhov et al. | 198/525 |
| 4,768,920 | 9/1988 | Gurth . | |
| 4,773,819 | 9/1988 | Gurth . | |
| 4,832,554 | 5/1989 | Gaskin | 414/189 |
| 4,988,239 | 1/1991 | Firth . | |
| 5,051,041 | 9/1991 | Firth . | |
| 5,137,220 | 8/1992 | Rose et al. | 198/642 X |

FOREIGN PATENT DOCUMENTS

| | | | |
|---|---|---|---|
| 725012 | 5/1932 | France | 406/99 |
| 1220175 | 2/1968 | United Kingdom . | |
| 1379075 | 1/1972 | United Kingdom | 17/14 |
| 8000472 | 4/1980 | WIPO | 406/99 |

*Primary Examiner*—James R. Bidwell
*Attorney, Agent, or Firm*—Loeb and Loeb

[57] ABSTRACT

An improved solids pump apparatus for transporting and metering particulate material including a transport channel having an inlet and an outlet. The transport channel is formed between substantially opposed faces of first and second rotary disks movable between the inlet and outlet towards the outlet and at least one arcuate wall extending between the inlet and outlet. The apparatus further includes a device provided adjacent the inlet for preventing a dead area from being formed to thereby provide a constant and uniform flow of the particulate solids within the apparatus.

31 Claims, 7 Drawing Sheets

APPARATUS WITH IMPROVED INLET AND METHOD FOR TRANSPORTING AND METERING PARTICULATE MATERIAL

BACKGROUND OF THE INVENTION

1. Field of the Invention

The present invention relates generally to apparatuses with improved inlets and methods for transporting and metering particulate material, and in particular embodiments to particulate material handling devices with improved inlets for improving the flow of particulate material, wherein the device can be used to both transport and meter particulate material, of a great range of particle sizes, under both ambient conditions and against pressure.

2. Description of Related Art

A wide variety of equipment has been used to either transport or meter particulate material (such as, but not limited to, coal, other mined materials, dry food products, other dry goods handled in solid, particle form). Such transport equipment includes conveyor belts, rotary valves, lock hoppers, screw-type feeders, etc. Exemplary measurement or metering devices include weigh belts, volumetric hoppers and the like. In order to provide both transport and metering of particulate material, it was typically necessary to use or combine both types of devices into a system.

However, some of applicant's prior pump devices were provided with the capability of both transporting and metering particulate material. Examples of such prior designs include the rotary disk type pumps discussed in the following U.S. patents, each of which is assigned or licensed to the assignee of present invention and each of which is incorporated herein by reference: U.S. Pat. No. 4,516,674 (issued May 14, 1985); U.S. Pat. No. 4,988,239 (issued Jan. 29, 1991); and U.S. Pat. No. 5,051,041 (issued Sep. 24, 1991).

The present inventor has found that particulate solids moving through a pumping system may encounter various forces (e.g, undesirable components of drive forces, frictional forces or gravitational forces) at different locations and at different directions within the system. These forces may inhibit or even stop the normal flow of the particulate solids at certain regions or areas at or around the inlet. This may cause the particulates to eventually bridge across the inlet and stop the particulate flow through the inlet. To illustrate this, FIG. 1 shows a rotary disk type solids pump 10, which has a housing (not shown), an inlet 12 and an outlet 14. A transport channel 16 extends between the inlet 12 and the outlet 14. The transport channel 16 is formed between substantially opposed faces of two rotary disks (one is shown at 17, the other is not shown in the figure) movable relative to the housing between the inlet 14 and the outlet 16 towards the outlet 14 and at least one arcuate wall extending between the inlet 12 and the outlet 14.

The pump 10 tends to impart a tangential force or thrust 18 on the particulate solids 20 in the direction of rotation 22 of the disks 17. At the inlet 12, this tangential thrust 18 tends to force the particulate solids 20 against a stationary wall 24. As a result, the particulate solids 20 at the side of the stationary wall 24 create a mass of slow moving or stationary solids in a "dead region" 28 at or adjacent the inlet 12.

This dead region 28 can reduce the rate of flow of material into the pump (and, thus, reduce the pumping rate). The build-up and/or possible collapse of a mass of particles in the dead region can cause fluctuations in the rate of flow of material through the pump and can, thereby, adversely affect the metering accuracy of the system. In systems pumping against a gas or fluid pressure or against a pressure head formed of particles, it may be important to maintain an unobstructed pump inlet so that the pump remains full of particulate material at all times to act as a pressure barrier.

Moreover, with certain particulate materials, the stagnation of the particles at the dead region 28 can cause further problems. For example, when food materials are conveyed through the pump 10, the food material held for an extended period at the dead region 28 may spoil or deteriorate and present a serious health problem. As another example, certain types of materials with a relatively high moisture content, when held for an extended period in the dead region 28, tend to become pliable and gummy, and more difficult to handle. Therefore, it would be desirable to provide an apparatus for driving or pumping the particulate solids having an inlet designed to minimize or avoid the formation of a dead region 28 in which particles are slowed or stopped.

A number of factors must be considered in the design of an efficient device for transporting or metering particulate materials. For example, the amount, size and type of particulate material to be transported must be taken into consideration. The distance over which the material is to be transported and variations in the surrounding pressure during transport must also be taken into account. It would be desirable to provide a pump device which is capable of transporting and metering a wide variety of particulate materials under both ambient and pressurized conditions.

Large scale transport and/or metering of particulate material presents unique problems. A transport apparatus or system which is suitable for transporting one type of particulate material may not be suitable for transporting a different type of material. For example, Kentucky coals maintain reasonable integrity when transported through conventional devices such as screw feeders and conveyor belts. However, Western United States coals tend to be more friable and may be degraded to a significant degree during normal transfer operations. It would be desirable to provide an apparatus which is capable of transferring all types of coal (or other friable materials) with a minimum amount of degradation.

The water content of the particulate solids is another factor which must be considered when designing any transport system. Many transport devices which are suitable for transporting completely dry particles do not function properly when the moisture content of the particulate material is raised. The same is true for particulate metering devices. Conventional metering devices which are designed to measure dry particulates may not be well suited to meter moist solids. It would be desirable to provide a transport apparatus which is capable of moving and/or metering particulate solids regardless of their moisture content.

There are also many instances in which it is desirable to transport and meter particulate materials against pressure (e.g., wherein gas and/or fluid pressure at the output side of the transport system is greater than the gas and/or fluid pressure at the input side of the system). It would be desirable to provide an apparatus which is capable of pumping and metering under both ambient pressure conditions and against a pressure head caused either by entry into a pressurized environment (wherein the gas and/or fluid pressure of the environment on the output side of the apparatus is greater than such at the input side).

It is apparent from the above background that there is a present need for a solids handling or pumping device which operates as a single unit to provide simultaneous transport and metering of particulate material and which has an improved inlet capable of minimizing or avoiding the creation of a dead region in which particles are slowed or stopped.

SUMMARY OF THE DISCLOSURE

It is an object of embodiments of the present invention to provide an apparatus and method for transporting and metering particulate materials with an improved inlet structure and method for an improved flow of material and, in particular embodiments, for improved metering and for an improved ability to pump against a pressure head.

It is another object of embodiments of the present invention to provide a solids pump which minimizes or avoids the formation of a dead region in which the movement of particles is slowed or stopped.

It is another object of embodiments of the present invention to provide a solids pump which is particularly suitable for transporting a wide range of particulate materials, including both small and large particulates and mixtures of them, having varying degrees of moisture content.

It is yet another object of embodiments of the present invention to provide a solids pump which provides a uniform flow of the particulate solids.

These and other objects and advantages are achieved in solids pumps in which, according to embodiments of the present invention, particulate material enters a transport duct located between two drive walls (such as, but not limited to, the facing walls of two parallel, opposed disks). Movement of the drive walls from an inlet towards an outlet causes the particles of the particulate material to interlock with each other, with the outermost particles engaging the drive walls, such that drive force is transferred from the drive walls to the particles. The inlet to the transport duct is improved so as to minimize or avoid the occurrence of the drive walls thrusting particles into a dead region, in which the movement of the particles is slowed or stopped.

According to one embodiment, the improved inlet is provided with a shroud plate adjacent to each drive wall. Each shroud plate is positioned adjacent a respective drive wall, so as to provide a barrier, inhibiting contact between the drive wall and the particulate material at locations on the drive wall which would otherwise tend to thrust the particles toward a dead region. In a further embodiment, the improved inlet is provided with an abutment wall shaped so as to minimize or avoid the formation of a dead region. In another embodiment, the improved inlet is provided with a stationary wall, opposite the abutment wall, which is shaped so as to minimize or avoid the formation of a dead region. In yet another embodiment, the improved inlet is provided with a particle propelling device (such as a driven paddle wheel structure, a drive roller, a vibrator, a pneumatic blower device or the like) for imparting an additional positive force on the particles (directed toward the drive duct of the apparatus) in the zone in which a dead region would otherwise be formed. Further embodiments employ a combination of some or all of the above embodiments to provide an improved inlet.

In preferred embodiments, particulate material is compacted or compressed within the transport duct sufficiently to cause the formation of a transient solid or bridges composed of substantially interlocking particulates spanning the width of a transport duct. Successive bridges occur cumulatively within the transport duct as further particulate material enters the inlet. For certain particulate materials, this cumulative bridging may occur without the use of chokes or dynamic relative disk motion. However, further embodiments may include chokes or dynamic relative disk motion. Examples of such chokes and disk motions are described in U.S. Pat. No. 5,051,041; U.S. Pat. No. 4,988,239 and U.S. patent application Ser. No. 07/929,880 (each of which are assigned or licensed to the assignee of the present application and each of which are incorporated herein by reference). In further embodiments, the drive walls may be provided with undulations or grooves for improving the ability of the system to drive the particulates through the transport channel.

The uniform and constant flow rate provided by the apparatus and method in accordance with embodiments of the present invention is particularly well suited for both transporting and metering particulate material under a variety of conditions. The volume of particulate material being delivered is conveniently and accurately determined by measuring the rotational speed of the disks and relating this to the cross-sectional area of the duct. During metering operations, conventional monitoring equipment may be included to ensure that the passageway is full of solids during the metering process.

The above discussed features, as well as other features and advantages of embodiments of the present invention will become better understood by reference to the following detailed description when considered in conjunction with the accompanying drawings.

DETAILED DESCRIPTION OF THE PREFERRED EMBODIMENTS

The following detailed description is of the best presently contemplated mode of carrying out the invention. This description is not to be taken in a limiting sense, but is made merely for the purpose of illustrating general principles of embodiments of the invention. The scope of the invention is best defined by the appended claims.

Various embodiments of the invention are discussed below with respect to rotary disk type structures, wherein two spaced apart, opposing walls of a pair of parallel, rotary disks form drive walls, with a transport duct or channel therebetween. However, it will be recognized that further embodiments of the invention may be operable with, or provided with, drive walls formed from structures other than rotary disks, such as spaced moveable walls which move in a generally linear manner and define a transport duct or channel therebetween.

Figure 2:
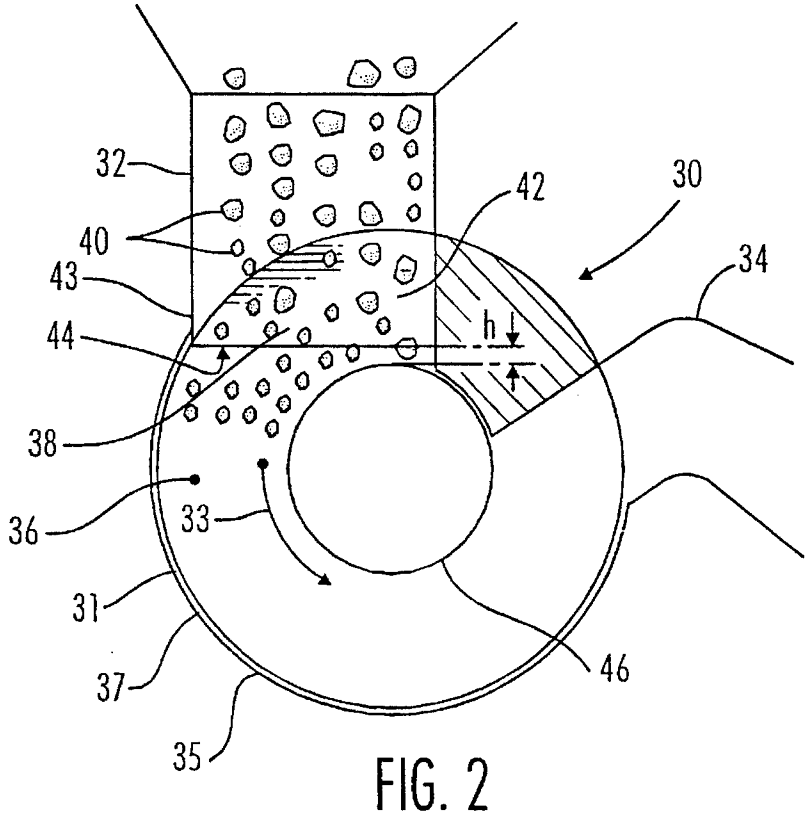
FIG. 2 is a schematic side view of a preferred exemplary apparatus, with one disk removed so as to show the pump interior and an embodiment of a preferred exemplary inlet provided with shroud plates between opposing interior surfaces of parallel rotary disks.

Apparatus according to an embodiment of the present invention is shown generally at 30 in FIG. 2. The apparatus 30 includes a housing (not shown), a rotary disk assembly 31, an inlet 32 and an outlet 34. A transport duct or channel 36 extends between the inlet 32 and the outlet 34. The rotary disk assembly 31 has two opposing rotary disks 37 (one of which is removed from the figure so as to show the interior of the apparatus). The disk assembly 31 may be coupled to any suitable drive system, such as, but not limited to a hydrostatic or electrically-driven motor (not shown), for rotating the disks 37 in the direction of arrow 33.

The transport duct 36 is formed between substantially opposed faces of the two rotary disks 37. As shown in FIG. 2, the transport duct 36 is further defined by at least one arcuate wall 35 extending between the inlet 32 and the outlet 34. Preferably, the arcuate wall 35 is stationary relative to the housing and may even be formed as part of the housing. As the disks 37 are rotated, the disk faces provide drive walls or surfaces along the transport duct which move relative to the housing in the direction from the inlet 32 towards the outlet 34. As discussed above, other embodiments may employ drive walls formed from opposing faces of other types of moving walls, e.g.,, other than rotary disks.

Figure 1:
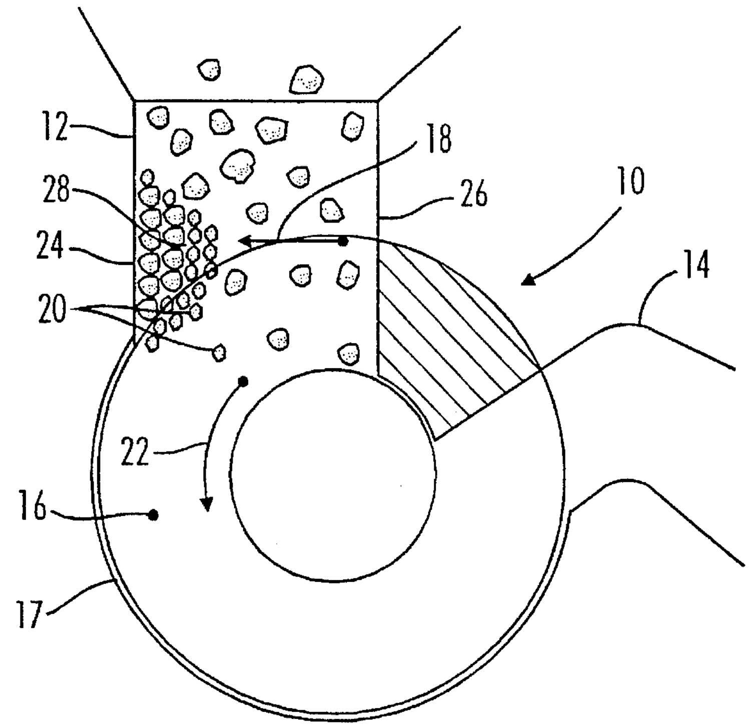
FIG. 1 (PRIOR ART)
FIG. 1 is a schematic side view of a prior art solids pump, with one disk removed, so as to show the pump interior.

Referring to FIG. 2, the transport duct 36 has a first section 38 between the two rotary disks 37 below the inlet 32 where particulate solids 40 fed through the inlet 32 are introduced into the transport duct 36. As discussed above with respect to FIG. 1, prior to improvements as set forth herein, some of the particles entering the first section 38 of the transport duct 36 would be thrusted or forced into a dead region, wherein a mass of slow moving or stopped particles would accumulate. However, embodiments of the present invention are provided with improved inlets capable of minimizing or avoiding the creation of such a mass of particles in a dead region.

Figure 3:
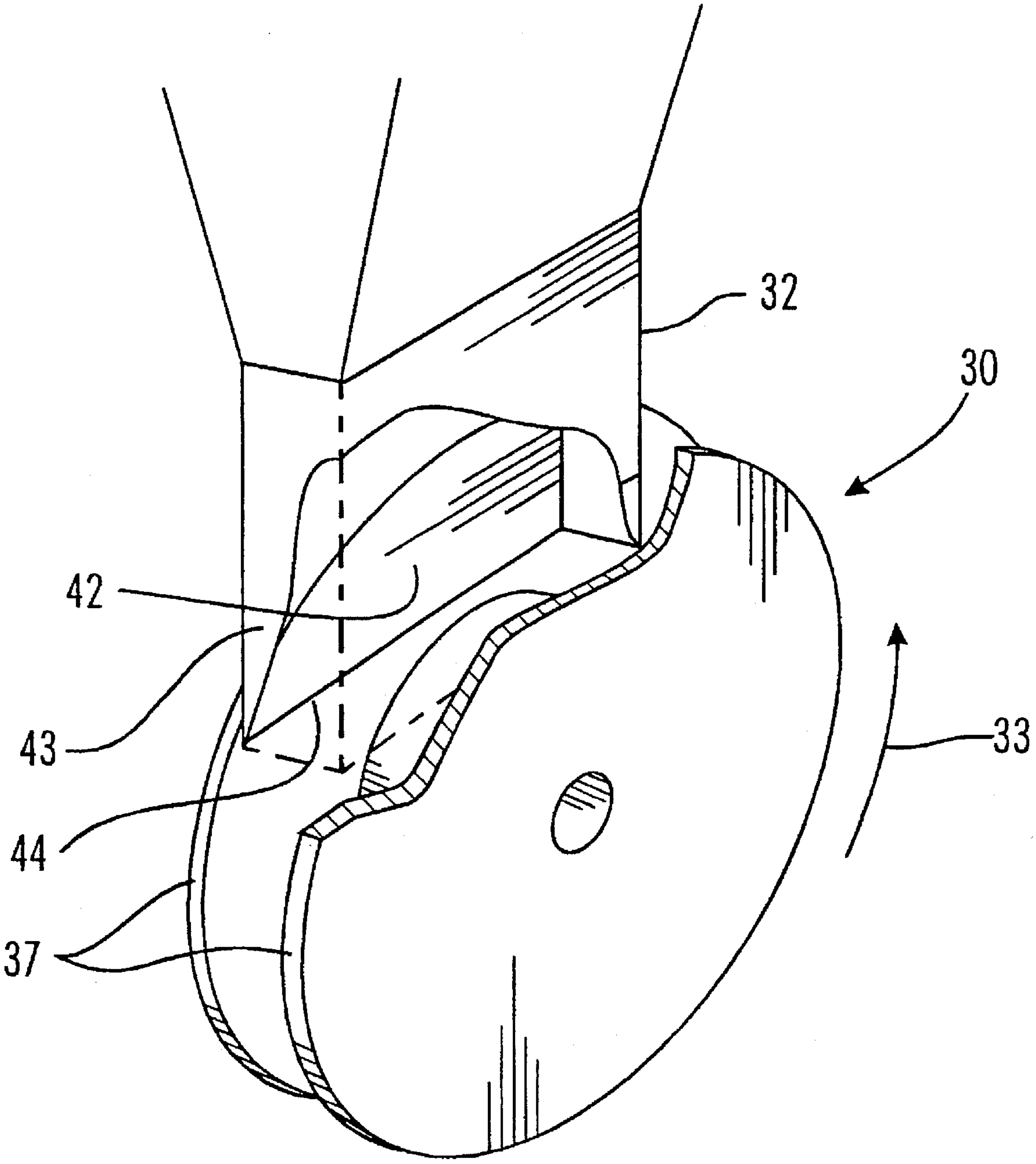
FIG. 3 is a perspective cut away view of the drive rotor of the preferred exemplary apparatus shown in FIG. 2, showing an embodiment of a preferred exemplary shroud plate assembly provided between parallel rotary disks.

According to one embodiment, best shown in FIGS. 2 and 3, a shroud plate assembly 42 is provided at the first section 38 between the two rotary disks 37. The shroud plate assembly 42 comprises two plate members positioned between the two rotary disks 37, with each plate member covering a portion of the surface of a respective disk 37, adjacent the first section 38 of the transport channel 36. As a result, the particulate solids 40 introduced into the first section 38 (between the two plate members of the shroud plate assembly 42) are substantially inhibited by the shroud plate assembly from contacting the drive surfaces of the rotary disks 37 within section 38.

Consequently, with the shroud plate assembly 42 in place, the tangential thrust or force which the disk drive surfaces would otherwise impart on the particulates 40 in the first section 38, does not act on the particulates. In this regard, depending upon its shape and position, the shroud plate assembly 42 can minimize, or even eliminate, the tangential thrust which would otherwise move the particulate solids 40 adjacent the periphery of the rotary disks 37 toward a stationary wall 43 of the inlet 32. As a result, the particulate solids 40 flow smoothly through the inlet 32, between the plate members of the shroud plate assembly 42.

It is noted that the particulate solids 40 moving through the shroud plate assembly 42 come in contact with the surfaces of the rotary disks 37 at different radii of the rotary disks 37 and at different angles with respect to the direction of rotation along the bottom end 44 of the shroud plate assembly 42. It has been found that the separation h between the bottom end 44 of the shroud plate assembly 42 and a hub 46 affects the uniformity and consistency of the flow of particulate solids 40 through the inlet 32 and the transport duct 36. In addition, the position of the shroud plate assembly 42 with respect to the transport channel 36 and the shape of the shroud plate assembly 42 which cover the surfaces of the rotary disks 37 affect the radial position (relative to the disks) at which particles exit the shroud plate assembly. Preferably, the separation h and the position and shape of the shroud plate assembly 42 are selected for optimum flow. The selection of these parameters depends upon the type of materials being transported and the environmental conditions under which the transportation would take place.

In the FIG. 2 embodiment, the shroud plate assembly 42 is fixed to the bottom end portion of the inlet 32. In alternative embodiments, the shroud plate assembly and the inlet may be formed as one integral unit. Furthermore, the shroud plate assembly may be fixed to structural members other than the inlet. In one embodiment, the shroud plate assembly is coupled to a hopper for storing particulate solids therein which is arranged to supply particulate solids to the inlet of the apparatus. In further embodiments, a hopper may have a vibrating means to facilitate feeding of particulate solids out of the hopper. The shroud plate assembly, in such embodiments, may be coupled to the vibrating means to further facilitate the flow of particulate solids.

Figure 4:
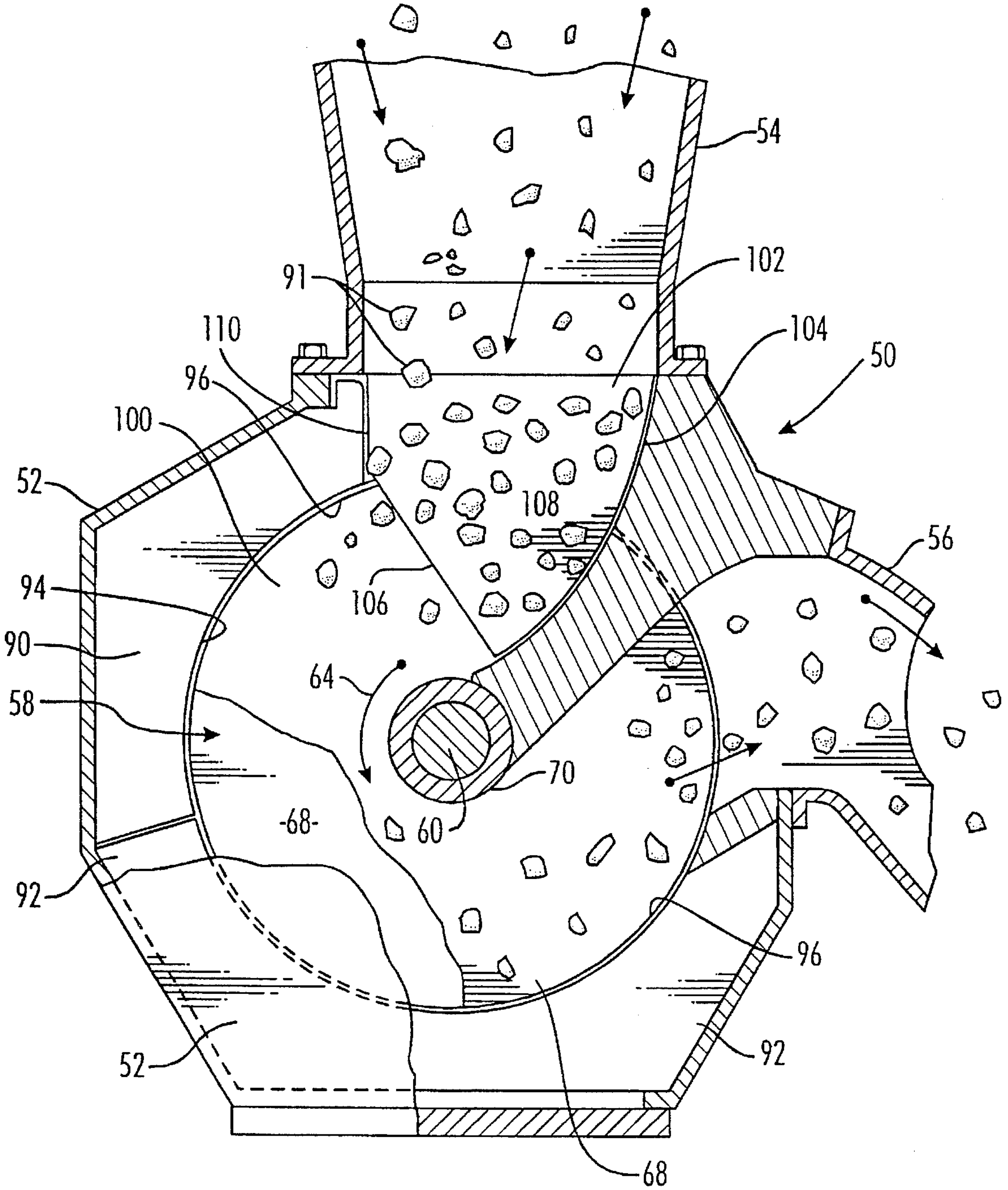
FIG. 4 is a partial sectional side view of a preferred exemplary apparatus, showing a preferred exemplary inlet in accordance with another embodiment of the present invention.

Apparatus according to another embodiment of the present invention is shown generally at 50 in FIG. 4. The apparatus 50 includes a housing 52, an inlet duct 54 and an outlet duct 56. A drive disk assembly 58 is rotatably mounted within the housing 52, on a shaft 60 for rotation about the axis of the shaft 60. Any suitable drive device, such as, but not limited to a hydrostatic or electrically-driven motor (not shown), may be operatively coupled to the drive disk assembly 58 (e.g., through the shaft 60) for rotatably driving the rotor in the direction of arrow 64 in FIG. 4.

Figure 5:
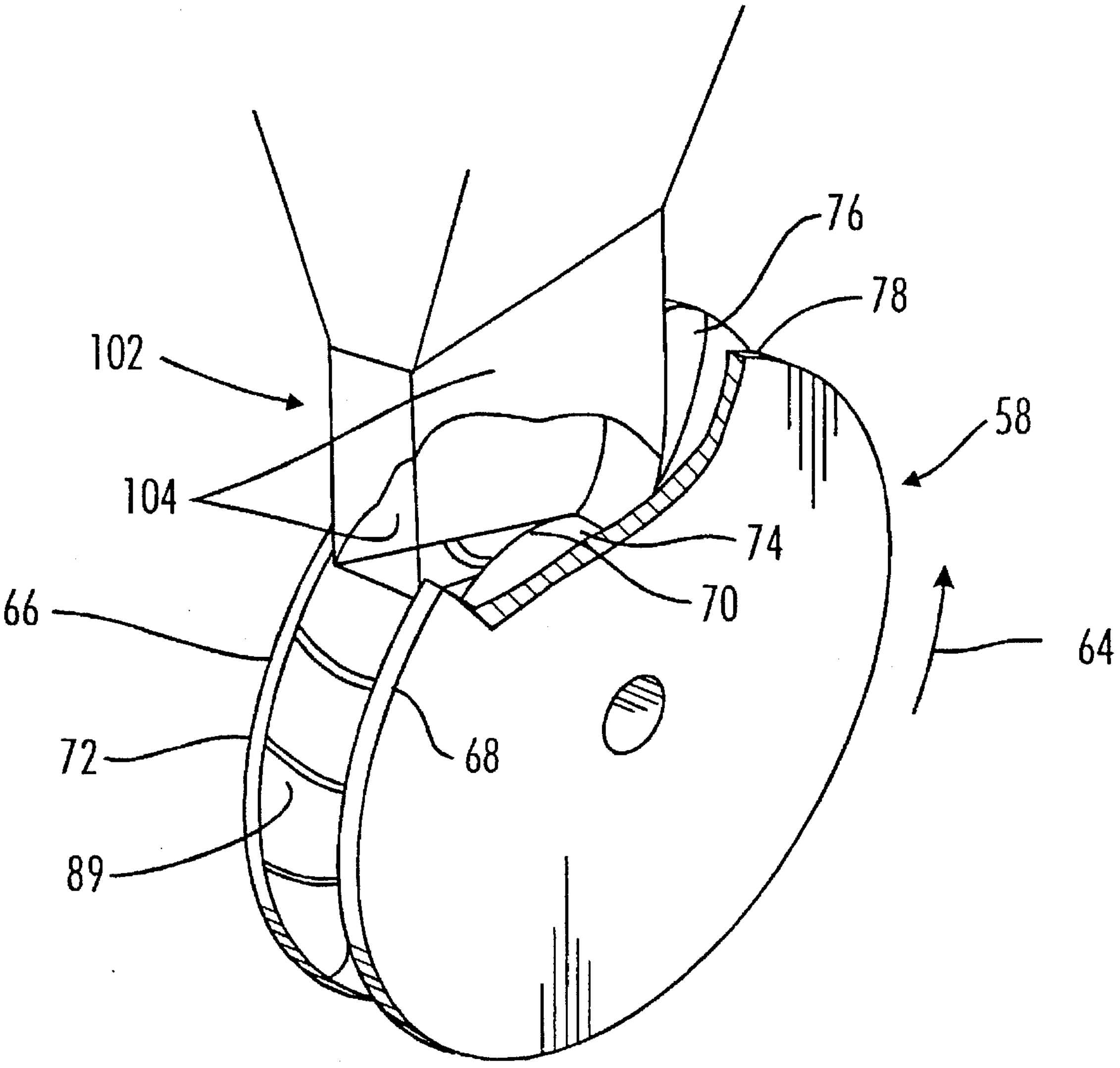
FIG. 5 is a perspective cut away view of the drive rotor of the preferred exemplary apparatus shown in FIG. 4 showing an embodiment of a preferred exemplary shroud plate assembly provided between parallel rotary disks.

As best shown in FIG. 5, the drive disk assembly 58 includes a pair of rotary disks 66 and 68, each having an inner diameter 70 and an outer diameter 72. The disk drive assembly 58 further includes a hub 74. Preferably, the disks of the drive disk assembly are separable in order to allow access to the interior of the pump apparatus and to facilitate servicing or replacement of parts of the apparatus.

The rotary disks 66 and 68 include opposing interior faces 76 and 78. The opposing interior faces 76 and 78 may be planar or include a plurality of discontinuities 89. Such surface discontinuities on the drive walls can improve the transmission of drive force to the particulate material, which can result in a further improved ability to pump against a pressure head.

The preferred exemplary apparatus 50 includes one or more exterior shoes such as those shown in FIG. 4 at 90 and 92. In further embodiments, a single stationary wall, such as discussed above with respect to wall 35 in FIG. 2, may be employed as an alternative to plural shoes.

The exterior shoes 90 and 92 are designed to close the transport duct formed between disk faces 76 and 78. Each of the exterior shoes 90 and 92 includes a stationary inner wall 94 and 96, respectively. Inner walls 94 and 96, in combination with the hub 74 and opposing interior faces 76 and 78, define the transport duct 100 and, thus, the boundary of the cross-sectional area of the duct at any given point along the length of the duct from the inlet to the outlet.

Both exterior shoes 90 and 92 are mounted to the housing by way of suitable mounting brackets or pins. Preferably, the inner wall, or inner walls in the case of plural shoes, are accurately formed so as to conform to the circular perimeter of the rotary disks 66 and 68. In one preferred embodiment, the inner wall of the shoe extends axially (transversely of the shoe) beyond interior surfaces 76 and 78, respectively, of the drive rotor 58 so as to overlap the interior surfaces 76 and 78 of the drive rotor. The shoe is placed as close as possible, within acceptable tolerances (dependent upon, e.g., the type and particle size of the material being transported), to the outer diameters 72 of interior faces 76 and 78. In the FIG. 4 configuration, the shoe is not radially adjustable to move closer or further away from the hub 74 of the drive rotor 58 to change the cross-sectional area of the primary transport channel 100.

In an alternative embodiment, the shoe is sized and shaped so as to fit between opposing interior faces 76 and 78 to form a curved outer wall for the primary transport channel 100. In this configuration, the radial location of the shoe may be adjusted toward or away from the hub 74 of the drive rotor 58 so as to change the cross-sectional area of the primary transport duct 100 and to select the general configuration of the duct as one of a generally diverging duct, converging duct or constant cross-sectional area duct. For this purpose, a screw adjuster may be connected to one or a plurality of shoes, for example, of the type shown in U.S. Pat. No. 4,988,239. The inward and outward adjustment of shoe allows setting up a choking or compaction of the solids as they move through the pump or, alternatively, to provide a diverging or a constant cross-sectional area along the duct.

In a further embodiment of the present invention, convergence or divergence of the cross-sectional area of the duct 100 and/or compaction of particulate solids is accomplished by positioning rotary disk 66 at an angle relative to rotary disk 68 such that the distance between the opposing interior faces 76 and 78 adjacent the inlet duct 54 is different than the distance between opposing interior faces 76 and 78 between inlet 54 and outlet 56. In further embodiments, the angle at which the rotary disks rotates relative to each other may be adjusted. Variation of the angle modifies the rate of change of the cross-sectional area between the inlet and the outlet to provide a different convergence or choke or divergence in the duct. Various aspects of the foregoing angled disk embodiments and preferred arrangements for accomplishing the same are more fully described in U.S. patent application Ser. No. 07/929,880 (assigned to the assignee of the present invention and incorporated herein by this reference).

Apparatus 50 further includes a shroud plate assembly 102 provided adjacent the inlet 54 between the two rotary disks 66 and 68. As best shown in FIG. 5, the shroud plate assembly 102 comprises a pair of plate members 104 which oppose and cover the drive surfaces of the two rotary disks 66 and 68 adjacent the inlet 54. Each plate member 104 is arranged adjacent a respective disk 66 or 68 and terminates at a bottom end 106 in an initial feed area 108 of the primary transport duct or channel 100. The initial feed area 108 may be generally defined as being between the inlet 54 and the portion of the hub 74 facing the inlet and between the two rotary disks 66 and 68.

As with the shroud plate assembly 42 discussed above, the shroud plate assembly 102 operates to substantially inhibit the particulate solids 91 introduced into the initial feed area 108 from contacting portions of the surfaces of the rotary disks 66 and 68. The shroud plate assembly 102, thus, minimizes or eliminates the tangential thrust which would otherwise move the particulate solids 91 adjacent the periphery of the rotary disks 66 and 68 toward a choke side wall 110 of the inlet 54 to form a mass of slow moving or stopped particles (a dead region).

Because the particulate solids 91 moving through the shroud plate assembly 102 come in contact with the surfaces of the rotary disks 37 at various radii relative to the disks 66 and 68 and at different angles with respect to the direction of rotation along the bottom end 106 of the shroud plate assembly 102, further improvements in achieving a uniform consistent flow of the particulate solids may be provided by selecting the configuration of the shroud plate assembly 102, including the angle of the bottom edge 106 of the shroud plate assembly relative to the direction of motion of the disks. The angle and shape of the bottom edge 106 determines at which radius along the drive disks the particles flowing out of any given location along the bottom edge 106 exit the shroud plate assembly.

The size of the drive rotor 58 may vary widely, depending upon the type and volume of material which is to be transported or metered. Typically, outside diameters for the rotary disks 66 and 68 may range from a few inches to many feet. The smaller rotary disks are well suited for use in transporting and metering relatively small volumes of solid material such as food additives and pharmaceuticals. The larger size disks may be utilized for transporting and metering large amounts of both organic and inorganic solid materials, including food stuffs, coal, gravel and the like. The apparatus is equally well suited for transporting and metering large and small particles and mixtures of them, and may be used to transport and meter both wet and dry particulate material.

Figure 6:
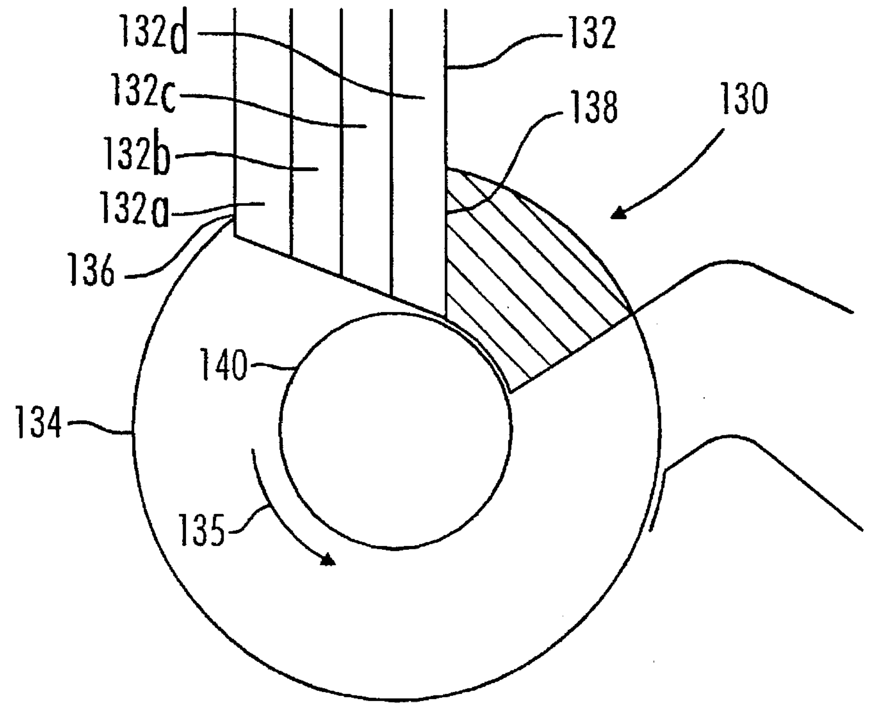
FIG. 6 is a schematic side view of yet another preferred exemplary apparatus, with one disk removed so as to show the pump interior and an embodiment of a preferred exemplary inlet duct and shroud plate assembly provided adjacent the inlet between opposing interior surfaces of parallel rotary disks.

Apparatus according to a further embodiment of the present invention is shown generally at 130 in FIG. 6. The apparatus 130 includes a multiple column inlet duct assembly 132 which also defines a shroud assembly. The assembly 132 is located between a pair of rotary disks 134 which rotate in the direction of an arrow 135. The assembly 132 may be adapted to feed one type of particulate material or a plurality of different types of particulate materials (a different material in each column) simultaneously into the transport duct or channel of the pump.

To improve the ability to provide a uniform, consistent flow of particulate solids through the apparatus 130, the multiple inlet duct assembly 132 includes multiple inlet duct columns 132*a* to 132*d*, each having walls (functioning as shroud plates as discussed above) adjacent a portion of the disks 134. The columns 132*a* to 132*d* terminate at mutually different radii along the rotary disks 134. In one embodiment of the present invention, the inlet duct column 132*a* located at a choke side 136 terminates adjacent the periphery of the rotary disks 134 and the inlet duct column 132*d* located at an abutment side 138 terminates adjacent a hub 140. The inlet duct column 132*b* extends deeper into the space between the rotary disks 134 than the inlet duct column 132*a*, and the inlet duct column 132*c* extend deeper than the inlet duct column 132*b* but shallower than the inlet duct column 132*d*. The configuration of the inlet duct assembly 132, including the individual duct lengths and cross-sectional sizes may be selected to provide a desired flow rate for each columnar duct.

Figure 7:
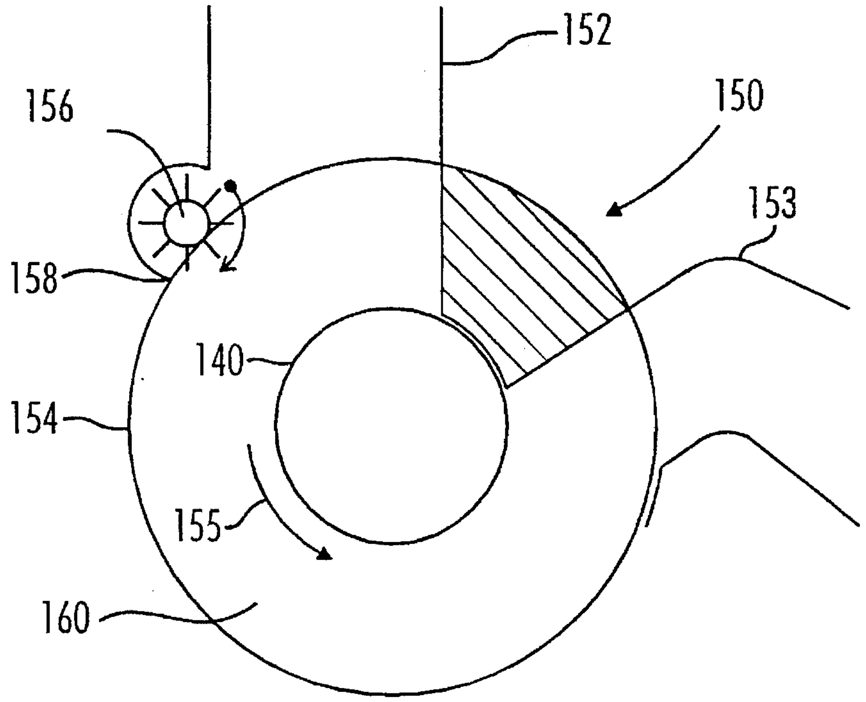
FIG. 7 is a schematic side view of a further preferred exemplary apparatus, with one disk removed so as to show the pump interior and an embodiment of a preferred exemplary positive motion device, comprising a paddle wheel device provided adjacent the inlet.

Apparatus according to yet a further embodiment of the present invention is shown generally at 150 in FIG. 7. The apparatus 130 includes an inlet 152, an outlet 153 and a pair of rotary disks 154 which rotate in the direction of an arrow 155. To inhibit the formation of a dead region adjacent the inlet 152, the FIG. 7 embodiment includes a propelling device or propelling means for applying a further positive force (directed toward the transport duct or channel of the device) on any particles which may begin to accumulate in the region that would otherwise become a dead region. In the FIG. 7 embodiment, the means for applying a further positive force comprises a paddle wheel 156. The paddle wheel 156 may be driven by any one of suitable driving means, such as a motor (not shown).

Figure 10:
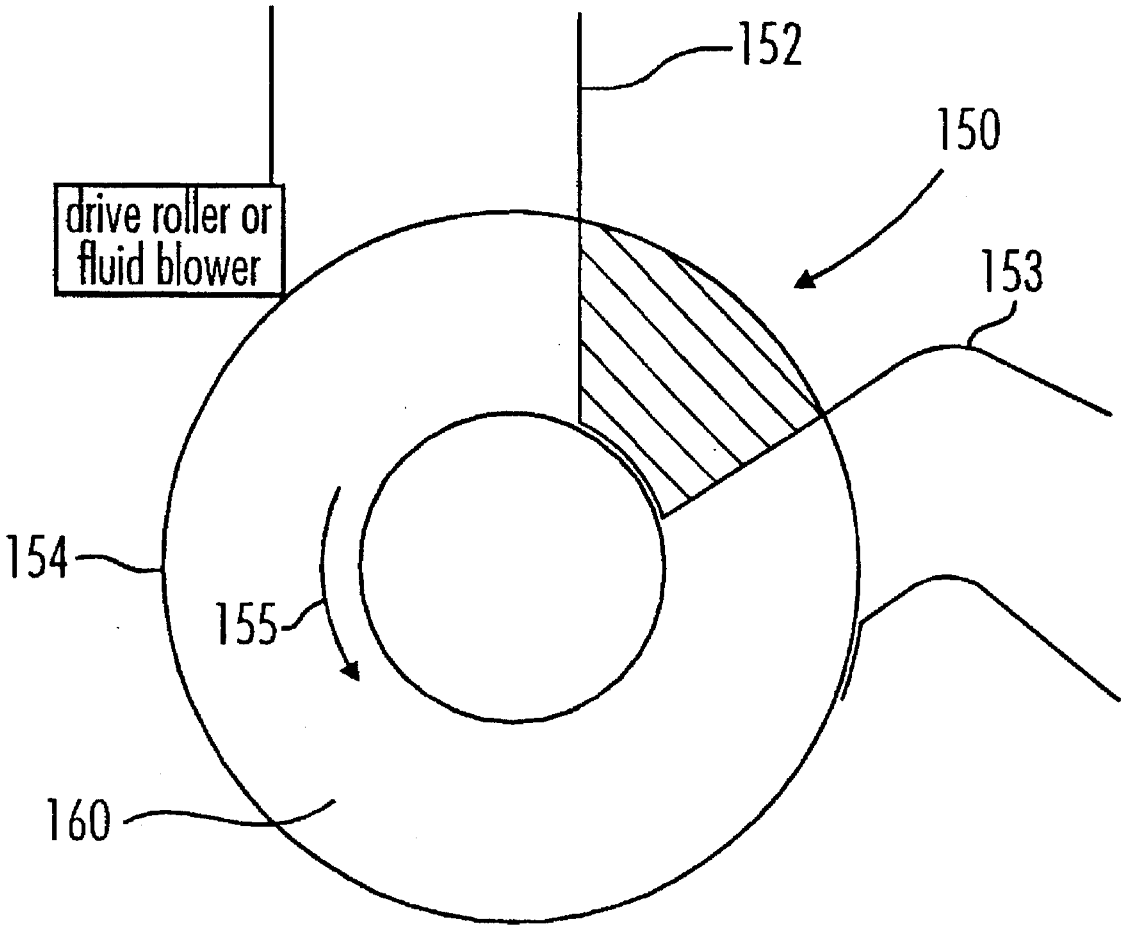
FIG. 10 is a schematic side view of a further preferred exemplary apparatus, with one disk removed to show the pump interior.

During the pump operation, particulate solids moved toward the choke side 158 by the tangential thrust of the disks are positively pushed by the paddle wheel into the primary transport duct 160. Preferably, the rotational speed of the paddle wheel 156 is adjusted to achieve a uniform, consistent flow of particulate solids through the inlet 152 and the primary transport duct 160. It will be understood that, while the FIG. 7 embodiment shows a paddle wheel devices as an example of means for applying a further positive force, other embodiments may employ any one or combination of such devices as drive rollers, vibrators, pneumatic devices, gas or fluid blowers, or the like, as shown in FIG 10.

Figure 8:
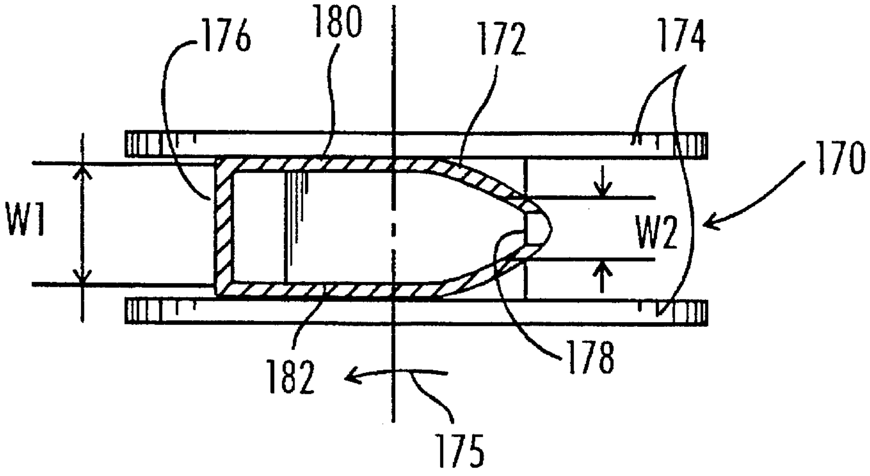
FIG. 8 is a schematic plan top view of yet a further preferred exemplary apparatus showing an embodiment of a preferred exemplary inlet duct.

Apparatus according to another embodiment of the present invention is shown generally at 170 in FIG. 8. The apparatus 170 includes an inlet 172 and a pair of rotary disks 174 which are rotated in the direction of an arrow 175. The inlet 172 has a cross-section configuration designed to minimize or avoid the creation of dead regions at or around the inlet 172, so as to provide a uniform, consistent flow of particulate solids through the inlet and the apparatus 170. In one embodiment, the inlet 172 has a width w1 at the outer diameter side (or choke side) 176 substantially larger than a width w2 at the abutment side 178. Preferably, the width w1 gradually narrows toward the width w2, which is approximately one third of the width w1. However, other suitable relative dimensions may be selected dependent upon the type of material being transported and the conditions under which the transportation operation is to take place.

The illustrated inlet configuration provides a flow rate of particulate solids at the abutment side 178 which is substantially smaller than that at the choke side 176 (due to the cross-sectional area of the inlet 172 on the abutment side being substantially less than that on the choke side. As a result, a lower percentage of the total incoming particles are subjected to the tangential thrust which may otherwise create a dead region. The likelihood of a dead region being formed is, therefore, reduced.

Figure 9:
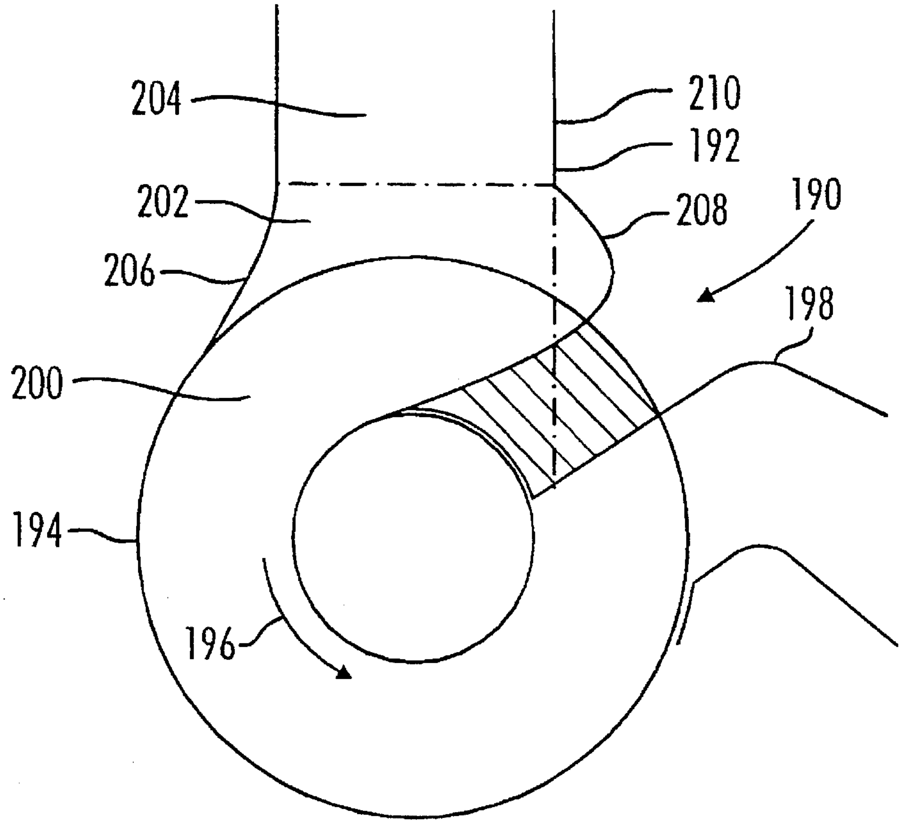
FIG. 9 is a schematic side view of another preferred exemplary apparatus, with one disk removed so as to show the pump interior and an embodiment of a preferred exemplary inlet duct configuration.

Apparatus according to yet another embodiment of the present invention is shown generally at 190 in FIG. 9. The apparatus 190 includes an inlet 192, an outlet 198 and a pair of rotary disks 194 which rotate in the direction of an arrow 196. A primary transport duct 200 is generally defined between the rotary disks 194 and between the inlet 192 and the outlet 198. In this preferred embodiment, the inlet 192 has a lower section 202 contiguous with the primary transport channel 200 and an upper section 204 which connects to the lower section 202 at the upstream side of the flow of particulate solids. The lower section 202 has a side wall on the outer diameter side (or a choke side wall) 206 and an abutment side wall 208 opposing the choke side wall 206, and located upstream of the choke side wall 206. It has been found that by forming either one or both of the walls 206 and 208 with substantial curved or concave portion where these walls meet or traverse the outer peripheral dimension of the disks, the tendency for particulate material to collect in a dead region can be substantially reduced or eliminated.

In one embodiment, the abutment side wall 208 is concave and bows out in the direction opposite to the disk rotation direction 196. In further preferred embodiments, the choke side wall 206 is angled to define a diverging inlet so that the flow of particulate solids moving through the inlet 210 is directed, upon entry into the primary transport duct 200 substantially in the same direction of the flow of particulate solids in the primary transport duct 200. The above discussed abutment and choke side wall configurations have been found to reduce the effect of tangential thrust which may otherwise create a dead region at or adjacent the inlet 210.

Apparatus in accordance with embodiments of the present invention may be utilized for transporting particulate material against gas or fluid pressure (e.g., wherein the pressure at the outlet side of the apparatus is greater than the pressure at the inlet side of the apparatus). Referring to FIGS. 4 and 5, it is preferred when pumping solids into pressurized systems that the entire cross-sectional area of at least portions of the transport channel 68 and the outlet 56 be filled with solids during pumping. This forms a dam at the pump outlet which is a barrier to possible deleterious effects of reverse flow of gases, liquids or solids back into the pump through the outlet. The cumulative bridging of the particulates provides a sequentially formed cascaded reinforcement which adds strength to the particle bridge portions closer to the outlet, so as to better withstand the higher pressure at the outlet side of the apparatus. The ability of embodiments of the present invention to improve the flow of material through the pump inlet thereby provides an improved ability to maintain the transport channel 68 and outlet 56 filled with solids, and, thus, an improved ability to pump against a pressure head.

The duct length is preferably designed such that a sufficient amount of cumulative, cascaded bridging occurs in the duct to support and withstand the higher pressure at the outlet side of the pump. This can be accomplished with a convergent duct, constant cross-section duct or divergent duct system. A divergent duct system (wherein the primary drive duct diverges from the inlet toward the outlet) may be beneficial for pumping into a pressurized system. In particular, the divergent duct would, in effect, be converging in the direction from the outlet toward the inlet, which would inhibit any movement of the transported mass of particulate material backwards through the pump (in the direction toward the inlet) by back-pressure forces.

In the above-described preferred embodiments of the present invention, the drive force of the drive rotor 58 for driving the solids through the primary transport duct 100 may be enhanced by discontinuities 52 in the opposing interior drive wall faces 66 and 68. Further structures and methods (such as described in the co-pending U.S. patent application titled "APPARATUS AND METHOD WITH IMPROVED DRIVE FORCE CAPABILITY FOR TRANSPORTING AND METERING PARTICULATE MATERIAL", filed Aug. 31, 1993, (attorney docket no. PD-2986) and the co-pending U.S. patent application titled "IMPROVED APPARATUS AND METHOD FOR TRANSPORTING AND METERING PARTICULATE MATERIAL INTO FLUID PRESSURE", filed Aug. 31, 1993, (attorney docket no. PD-2987), both of which are assigned to the assignee of the present invention and are incorporated herein by reference) may be employed to provide additional drive forces and/or to further improve the ability of the apparatus to pump against resistances, such as for example, particle pressure, gas pressure or other fluid pressure.

Apparatus elements, such as the disks, duct walls and shoes are preferably made of high strength steel or other suitable material. The interior surfaces of drive disks and the interior walls of the shoes are preferably provided with an abrasion-resistant metal or other suitable material having non-adhesive qualities to facilitate discharge at the outlet during operation and to facilitate cleaning during maintenance. In suitable applications, the interior surfaces of the rotary disks and the interior wall of the shoes may be composed of a low friction material, such as polytetrafluoroethylene.

The presently disclosed embodiments are to be considered in all respects as illustrative and not restrictive. The scope of the invention being indicated by the appended claims, rather than the foregoing description, and all changes which come within the meaning and range of equivalency of the claims are, therefore, intended to be embraced therein.

What is claimed is:

1. An improved apparatus for transporting particulate material of the type having a movable wall structure defining a transport channel and having an inlet for receiving particulate material into the channel and an outlet for emitting particulate material from the channel, the inlet defining an inlet channel contiguous with the transport channel to provide a continuous flow path for particulate material to flow through the inlet channel and into the transport channel, wherein the movable wall structure defines at least one wall movable in the direction from the inlet toward the outlet for imparting a force directed toward the outlet on particulate material entering the channel from the inlet, the improvement comprising:

a shroud member assembly having a first member extending at least partially across a portion of the continuous flow path as defined by the inlet channel and the transport channel and covering a portion of the moveable wall adjacent the inlet for inhibiting the movable wall from imparting a force on the particulate material as the material passes through the inlet.

2. An apparatus for transporting particulate material according to claim 1, wherein said moveable wall structure further comprises a second wall moveable in the direction from the inlet toward the outlet and wherein said shroud member assembly comprises a second member covering a portion of the second moveable wall adjacent the inlet for inhibiting the second movable wall from imparting a force on the particulate material as the material passes through the inlet.

3. An apparatus for transporting particulate material according to claim 1, wherein at least a portion of the shroud member assembly extends into the channel.

4. An apparatus for transporting particulate material according to claim 2, wherein at least a portion of the shroud member assembly extends into the channel, between the two movable walls.

5. An improved apparatus for transporting particulate material of the type having a movable wall structures defining a transport channel and having an inlet for receiving particulate material into the channel and an outlet for emitting particulate material from the channel, wherein the movable wall structure defines at least first and second walls movable in the direction from the inlet toward the outlet for imparting a force directed toward the outlet on particulate material entering the channel from the inlet, the improvement comprising;

a shroud member assembly having a first member covering a portion of the first moveable wall adjacent the inlet for inhibiting the first movable wall from imparting a force on the particulate material as the material passes through the inlet;

said shroud member assembly comprises a second member covering a portion of the second moveable wall adjacent the inlet for inhibiting the second movable wall from imparting a force on the particulate material as the material passes through the inlet;

wherein each respective movable wall comprises a face of a respective rotary disk, said apparatus further comprising a hub coupled to each rotary disk, wherein said primary transport channel has an initial feed area adjacent a junction between said inlet and said primary transport channel and being generally defined between said inlet and said hub, and wherein said shroud member assembly substantially covers said face of said rotary disk adjacent the inlet to substantially inhibit the disks from imparting a tangential force on particulate material entering in said initial feed area from the inlet.

6. An improved apparatus for transporting particulate material of the type having a movable wall structure defining a transport channel and having an inlet for receiving particulate material and passing the particulate material into the channel and an outlet downstream of said inlet for emitting particulate material from the channel, wherein the movable wall structure defines at least one wall moveable in the direction from the inlet toward the outlet for imparting a force directed toward the outlet on particulate material entering the channel from the inlet, the improvement comprising:

a propelling device disposed substantially outside of the transport channel and adjacent the inlet for imparting a force directed toward the channel on particulate material passing through the inlet within the vicinity of the propelling device.

7. An apparatus for transporting particulate material according to claim 6, wherein the apparatus further comprises a first wall located on the downstream side of the inlet, relative to the direction of movement of the moveable walls, the first wall being positioned such that at least a portion of particulate material passing into the inlet is directed by moveable walls toward the first wall, and wherein the propelling device is provided adjacent the first wall.

8. An improved apparatus for transporting particulate material of the type having a movable wall structure defining a transport channel and having an inlet for receiving particulate material and passing the particulate material into the channel and an outlet for emitting particulate material from the channel, wherein the movable wall structure defines at least first and second spaced apart walls moveable in the direction from the inlet toward the outlet for imparting a force directed toward the outlet on particulate material entering the channel from the inlet, the improvement comprising:

a propelling device disposed adjacent the inlet for imparting a force directed toward the channel on particulate material passing through the inlet within the vicinity of the propelling device;

wherein said propelling device is disposed to impart a force directed toward the space between the two moveable walls on particulate material passing through the inlet within the vicinity of the propelling device.

9. An improved apparatus for transporting particulate material of the type having a movable wall structure defining a transport channel and having an inlet for receiving particulate material and passing the particulate material into the channel and an outlet for emitting particulate material from the channel, wherein the movable wall structure defines at least one wall moveable in the direction from the inlet toward the outlet for imparting a force directed toward the outlet on particulate material entering the channel from the inlet, the improvement comprising:

a propelling device comprising a paddle wheel device disposed adjacent the inlet for imparting a force directed toward the channel on particulate material passing through the inlet within the vicinity of the propelling device.

10. An improved apparatus for transporting particulate material of the type having a movable wall structure defining a transport channel and having an inlet for receiving particulate material and passing the particulate material into the channel and an outlet for emitting particulate material from the channel, wherein the movable wall structure defines at least one wall moveable in the direction from the inlet toward the outlet for imparting a force directed toward the outlet on particulate material entering the channel from the inlet, the improvement comprising:

a propelling device comprising a drive roller device disposed adjacent the inlet for imparting a force directed toward the channel on particulate material passing through the inlet within the vicinity of the propelling device.

11. An improved apparatus for transporting particulate material of the type having a movable wall structure defining a transport channel and having an inlet for receiving particulate material and passing the particulate material into the channel and an outlet for emitting particulate material from the channel, wherein the movable wall structure defines at least one wall moveable in the direction from the inlet toward the outlet for imparting a force directed toward the outlet on particulate material entering the channel from the inlet, the improvement comprising:

a propelling device comprising a fluid blower device disposed adjacent the inlet for imparting a force directed toward the channel on particulate material passing through the inlet within the vicinity of the propelling device.

12. An improved apparatus for transporting particulate material of the type having a movable wall structure defining a transport channel and having an inlet for receiving particulate material into the channel and an outlet for emitting particulate material from the channel, wherein the movable wall structure defines at least one disk wall coupled to a central hub and moveable in the direction from the inlet toward the outlet for imparting a force directed toward the outlet on particulate material entering the channel from the inlet, the improvement comprising:

a first wall located on the downstream side of the inlet, relative to the direction of movement of the moveable walls, the first wall being positioned such that at least a portion of particulate material passing into the inlet is directed by the moveable wall toward the first wall, and a second wall located on the upstream side of the inlet relative to the direction of movement of the moveable walls and extending into the transport channel toward the central hub, the second wall being positioned such that at least a portion of particulate material passing into the inlet is directed by the moveable wall away from the second wall;

wherein the second wall defines a substantially straight surface portion extending in a substantially vertical direction outside of the transport channel and a curved surface portion extending from the substantially straight surface portion toward the hub and into the transport channel, the curved surface portion having a concave surface section laterally offset from the straight surface section in the upstream direction relative to the direction of movement of the moveable walls:

the curved surface portion having a further surface section extending between the concave surface section and the hub and laterally offset from the straight surface section in the downstream direction relative to the direction of movement of the moveable walls.

13. An apparatus for transporting particulate material according to claim 12, wherein the first wall defines a concavity in the inlet, adjacent the transport channel.

14. An improved apparatus for transporting particulate material of the type having a movable wall structure defining a transport channel and having an inlet for receiving particulate material into the channel and an outlet for emitting particulate material from the channel, wherein the movable wall structure defines at least one wall moveable in the direction from the inlet toward the outlet for imparting a force directed toward the outlet on particulate material entering the channel from the inlet, the improvement comprising:

a first wall located on the downstream side of the inlet, relative to the direction of movement of the moveable walls, the first wall being positioned such that at least a portion of particulate material passing into the inlet is directed by the moveable wall toward the first wall, and a second wall located on the upstream side of the inlet relative to the direction of movement of the moveable walls and extending into the transport channel, the second wall being positioned such that at least a portion of particulate material passing into the inlet is directed by the moveable wall away from the second wall, the second wall defining a concavity in the inlet, adjacent the transport channel;

a shroud member assembly having a first member covering a portion of the moveable wall adjacent the inlet for inhibiting the moveable wall from imparting a force on the particulate material as the material passes through the inlet.

15. An apparatus for transporting particulate material according to claim 14, wherein said moveable wall structure further comprises a second wall movable in the direction from the inlet toward the outlet and wherein said shroud member assembly comprises a second member covering a portion of the second movable wall adjacent the inlet for inhibiting the second movable wall from imparting a force on the particulate material as the material passes through the inlet.

16. An improved apparatus for transporting particulate material of the type having a movable wall structure defining a transport channel and having an inlet for receiving particulate material into the channel and an outlet for emitting particulate material from the channel, wherein the movable wall structure defines at least one wall movable in the direction from the inlet toward the outlet on particulate material entering the channel from the inlet, the improvement comprising:

a first wall located on the downstream side of the inlet, relative to the direction of movement of the movable wall, the first wall begin positioned such that at least a portion of particulate material passing into the inlet is directed by the movable wall toward the first wall, and a second wall located on the upstream side of the inlet relative to the direction of movement of the movable wall and extending into the transport channel, the second wall being positioned such that at least a portion of particulate material passing into the inlet is directed by the movable wall away from the second wall;

wherein the inlet defines an inlet opening, between the first and second walls and adjacent the moveable wall, through which particulate material may pass into the channel, the inlet opening defining a cross-section shape having a first width at the first wall side of the inlet opening and a second width at the second wall side of the inlet opening, said first width being greater than said second width.

17. An apparatus for transporting particulate material according to claim 16, wherein said first width is approximately three times larger than said second width.

18. An apparatus for transporting particulate material, comprising:

a transport duct defining a transport channel having an inlet for receiving particulate material and an outlet for emitting particulate material, the inlet defining an inlet channel contiguous with the transport channel to provide a continuous flow path for particulate material to flow through the inlet channel and into the transport channel;

a first wall movable adjacent the channel in the direction from the inlet toward the outlet, for imparting a force directed toward the outlet on particulate material entering the channel from the inlet;

a shroud member assembly having a first member extending at least partially across a portion of the continuous flow path of the inlet channel and the transport channel and covering a portion of the first movable wall adjacent the inlet for inhibiting the first movable wall from imparting a force on the particulate material as the material passes through the inlet.

19. An apparatus for transporting particulate material according to claim 18, further comprising a second wall facing the first moveable wall and arranged adjacent the channel, said second wall being moveable in the direction from the inlet toward the outlet and wherein said shroud member assembly comprises a second member covering a portion of the second movable wall adjacent the inlet for inhibiting the second movable wall from imparting a force on the particulate material as the material passes through the inlet.

20. An apparatus for transporting particulate material according to claim 19, wherein at least a portion of the shroud member assembly extends into the channel, between the two movable walls.

21. An apparatus for transporting particulate material, comprising:

a transport duct defining a channel having an inlet for receiving particulate material and an outlet for emitting particulate material;

a first wall movable adjacent the channel in the direction from the inlet toward the outlet, for imparting a force directed toward the outlet on particulate material entering the channel from the inlet;

a shroud member assembly having a first member covering a portion of the first movable wall adjacent the inlet for inhibiting the first movable wall from imparting a force on the particulate material as the material passes through the inlet;

a first inlet wall located on the downstream side of the inlet, relative to the direction of movement of the moveable walls, the first inlet wall being positioned such that at least a portion of particulate material passing into the inlet is directed by the first moveable wall toward the first inlet wall, and a second inlet wall located on the upstream side of the inlet relative to the direction of movement of the moveable walls and extending into the channel, the second inlet wall being positioned such that at least a portion of particulate material passing into the inlet is directed by the first moveable wall away from the second inlet wall;

wherein the second inlet wall defines a concavity in the inlet, adjacent the channel.

22. An apparatus for transporting particulate material according to claim 21, wherein the first inlet wall defines a concavity in the inlet, adjacent the channel.

23. A method for making apparatus for transporting particulate material, comprising the steps of:

providing a first movable wall defining a transport channel;

providing an inlet in particle flow communication with the transport channel, the inlet defining an inlet channel contiguous with the transport channel to provide a continuous flow path for particulate material to flow through the inlet channel and into the transport channel; and disposing a first shroud member within the inlet, the shroud member extending at least partially across a portion of the continuous flow path of the inlet channel and the transport channel and extending over a portion of the first movable wall.

24. A method according to claim 23, further comprising the steps of:

providing a second movable wall adjacent and spaced apart from the first movable wall, wherein the space between the first and second movable walls defines the transport channel; and disposing a second shroud member within the inlet and extending over a portion of the second movable wall.

25. A method according to claim 24, wherein the steps of providing first and second moveable walls comprises the steps of:

arranging first and second disk members adjacent and spaced apart from each other; and supporting the first and second disk members for rotational motion.

26. A method for transporting particulate material in a transport channel defined between two movable walls, comprising the steps of:

passing particulate material in an inlet channel which is contiguous with the transport channel to provide a continuous flow path for particulate material to flow through the inlet channel and into the transport channel;

covering at least a portion of each movable wall with a shroud member extending at least partially across a portion of the continuous flow path of the inlet channel and the transport channel and disposed adjacent the inlet; and passing particulate material from the inlet, adjacent the shroud member, into the channel.

27. A method for transporting particulate material with an apparatus having a movable wall structure defining a transport channel and having an inlet for receiving particulate material into the channel and an outlet for emitting particulate material from the channel, wherein the movable wall structure defines at least one wall movable in the direction from the inlet toward the outlet for imparting a force directed toward the outlet on particulate material entering the channel from the inlet, the method comprising the steps of:

passing a volume of particulate material through the inlet and into the channel;

providing a first wall on the downstream side of the inlet, relative to the direction of movement of the movable wall, the first wall being positioned such that at least a portion of particulate material passing into the inlet is directed by the movable wall toward the first wall, and providing a second wall on the upstream side of the inlet relative to the direction of movement of the movable wall and extending into the transport channel, the second wall being positioned such that at least a portion of particulate material passing into the inlet is directed by the movable wall away from the second wall;

providing an inlet opening, between the first and second walls and adjacent the movable wall, through which particulate material may pass into the channel, the inlet opening defining a cross-section shape having a first width at the first wall side of the inlet opening and a second width at the second wall side of the inlet opening, said first width being greater than said second width.

28. An apparatus for transporting particulate material according to claim 27, wherein said first width is approximately three times larger than said second width.

29. A method for transporting particulate material with an apparatus having a movable wall structure defining a transport channel and having an inlet for receiving particulate material into the channel and an outlet for emitting particulate material from the channel, wherein the movable wall structure defines at least one disk wall coupled to a central hub and moveable in the direction from the inlet toward the outlet for imparting a force directed toward the outlet on particulate material entering the channel from the inlet, the improvement comprising:

passing a volume of particulate material through the inlet and into the channel;

providing a first wall on the downstream side of the inlet, relative to the direction of movement of the moveable walls, the first wall being positioned such that at least a portion of particulate material passing into the inlert is directed by the moveable wall toward the first wall, and providing a second wall located on the upstream side of the inlet relative to the direction of movement of the moveable walls and extending into the transport channel toward the central hub, the second wall having a substantially straight surface portion and a curved surface portion and being positioned such that at least a portion of particulate material passing into the inlet is directed by the moveable wall away from the second wall;

wherein the step of providing a second wall comprises the steps of:

disposing the substantially straight surface portion of the second wall in a substantially vertical direction outside of the transport channel, disposing the curved surface portion at least partially within the transport channel and extending from the substantially straight surface portion toward the hub, the curved surface portion having a concave surface section and a further surface section, disposing the concave surface section in a position laterally offset from the straight surface section in the upstream direction relative to the direction of movement of the moveable walls: and disposing the further surface section between the concave surface section and the hub and laterally offset from the straight surface section in the downstream direction relative to the direction of movement of the moveable walls.

30. An apparatus for transporting particulate material according to claim 29, wherein the first wall defines a concavity in the inlet, adjacent the transport channel.

31. A method for transporting particulate material with an apparatus having a movable wall structure defining a transport channel and having an inlet for receiving particulate material and passing the particulate material into the channel and an outlet for emitting particulate material from the channel, wherein the movable wall structure defines at least one wall movable in the direction from the inlet toward the outlet for imparting a force directed toward the outlet on particulate material entering the channel from the inlet, the method comprising the step of:

imparting a force directed toward the channel on particulate material passing through the inlet with a propelling device, said propelling device being disposed substantially outside of the transport channel.

* * * * *